Culp & Keeney,
Pitman Coupling,
No. 2,604, Reissued May 14, 1867.
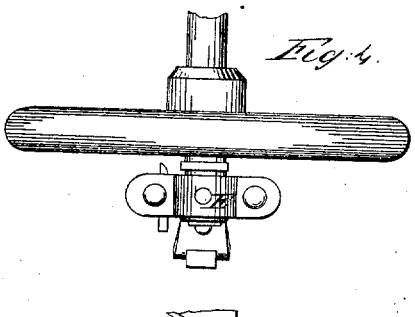
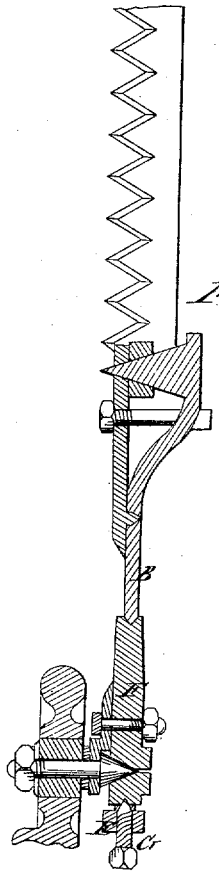
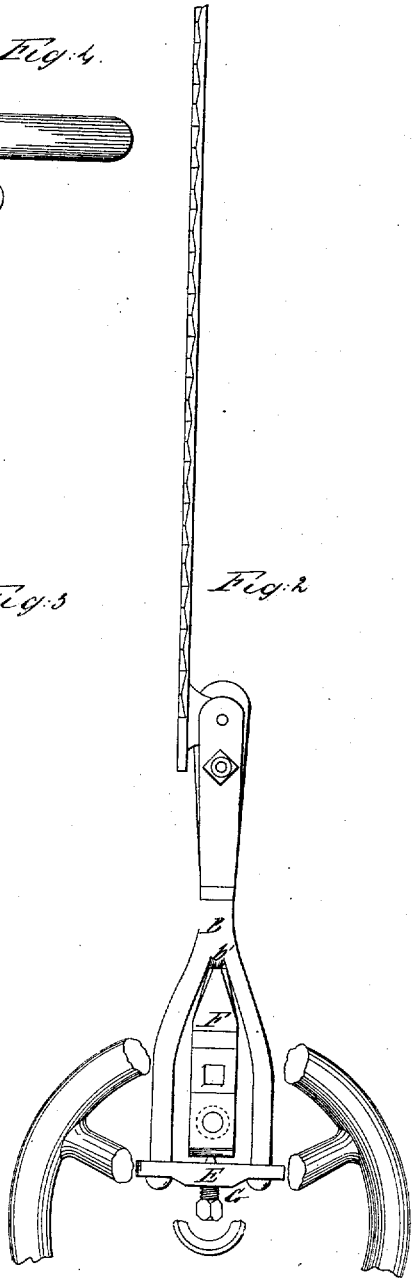
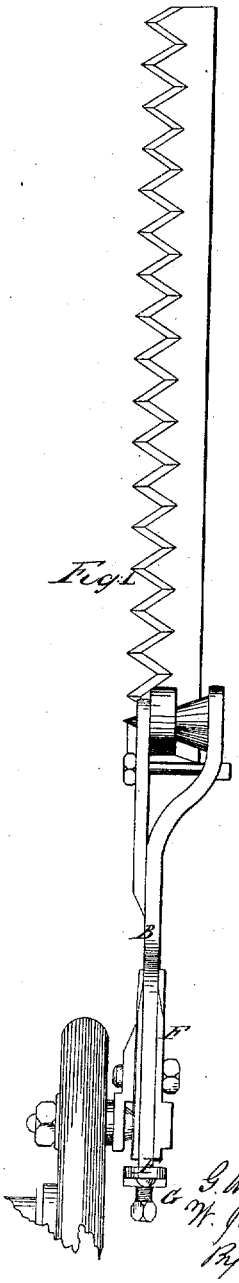
Witnesses
Andrew Whiteley
Philip C. Dittenck
Inventor
G. W. D. Culp
W. J. Keeney,
By their atty
R. R. Smith
AM. PHOTO-LITHO. CO. N.Y. (OSBORNE'S PROCESS)

United States Patent Office.

GEORGE W. D. CULP, OF ALLENSVILLE, AND WILLIAM J. KEENEY, OF FLORENCE, INDIANA.

*Letters Patent No.* 39,633, *dated August* 25, 1863; *reissue No.* 2,604, *dated May* 14, 1867.

DIVISION C.

IMPROVEMENT IN HARVESTER CUTTER-BAR CONNECTION.

The Schedule referred to in these Letters Patent and making part of the same.

TO ALL WHOM IT MAY CONCERN:

Be it known that we, G. W. D. CULP, of Allensville, and W. J. KEENEY, of Florence, in the county of Switzerland, and State of Indiana, have invented a new and useful Improvement in Mounting and Communicating Motion to the Cutting Apparatus of Harvesting Machines; and we do hereby declare the following to be a full, clear, and exact description of the same, reference being had to the accompanying drawings, in which—

Figure 1 is a plan view of our invention.

Figure 2 is a side elevation of the same.

Figure 3 is a horizontal longitudinal section of the same.

Figure 4 is an elevation of the inner end of the pitman.

The object of that part of our invention embraced in this patent is to provide a pivoted box for the wrist or journal at the crank end of the pitman, by means of which the pitman may roll as required by changes in the position of the guard-fingers without any cramping of the journals; and it consists, first, in a pivoted box for the wrist, connected to the pitman; second, located between the branches or arms of the fork formed at one end of the pitman; third, and hung upon centres, one of which is a part of the pitman and the other a centre-screw inserted through a cross-head, and both coincident with the axis of the pitman.

That others may understand our invention we will describe it.

The inner end of the pitman B is forked, as shown in fig. 2, and the two forks are connected at their ends by a cross-head, E. F represents a solid box, pivoted within the forks of the pitman, its respective ends being pivoted upon a projecting point, *b'*, and centre-screw G, the latter passing through the cross-head E, and both about coincident with the axis of the pitman.. The centre-screw G serves to take up lost motion between its point and the point *b'*, and it also permits the convenient and ready removal of the box F from the pitman when from any cause it becomes necessary. The box F forms the bearing for the wrist at the crank end of the pitman.

It is sometimes necessary to change the angle of the guard-fingers to the main frame, so that they may set high or low, as desired. Every such change in the horizontality of the guard-fingers, relative to the main frame, causes a corresponding rotary or twisting movement of the pitman upon its axis, and as the crank cannot be changed in any respect, the journals must cramp and the friction be very greatly increased. With a rocking box which may with freedom change its position in regard to the pitman, while it retains its relation to the crank-wrist, it is evident there can be no cramping of the journal at either end, and that the durability of the journals will be increased, and the power required to propel the machine will be decreased.

Having described our invention, what we claim as new, and desire to secure by Letters Patent, is—

Connecting the pitman of a harvesting machine to the crank or fly-wheel wrist by means of a solid pivoted box, as and for the purposes set forth and described.

The forked pitman, or its equivalent, provided with pivot points opposite each other, in combination with the pivoted box provided with centres for said pivot points, so arranged that said box may rock freely, as described and for the purpose set forth.

The centre-screw G, or its equivalent, in combination with the pivoted box F and pitman B, for the purpose of taking up the slack on the pivots of the pivoted box, substantially as described.

GEO. W. D. CULP,
WM. J. KEENEY.

Witnesses:
WM. LAND,
JOHN ORM,
GEO. W. KNAPP,
JOHN W. REXFORD.